Patented Feb. 3, 1931

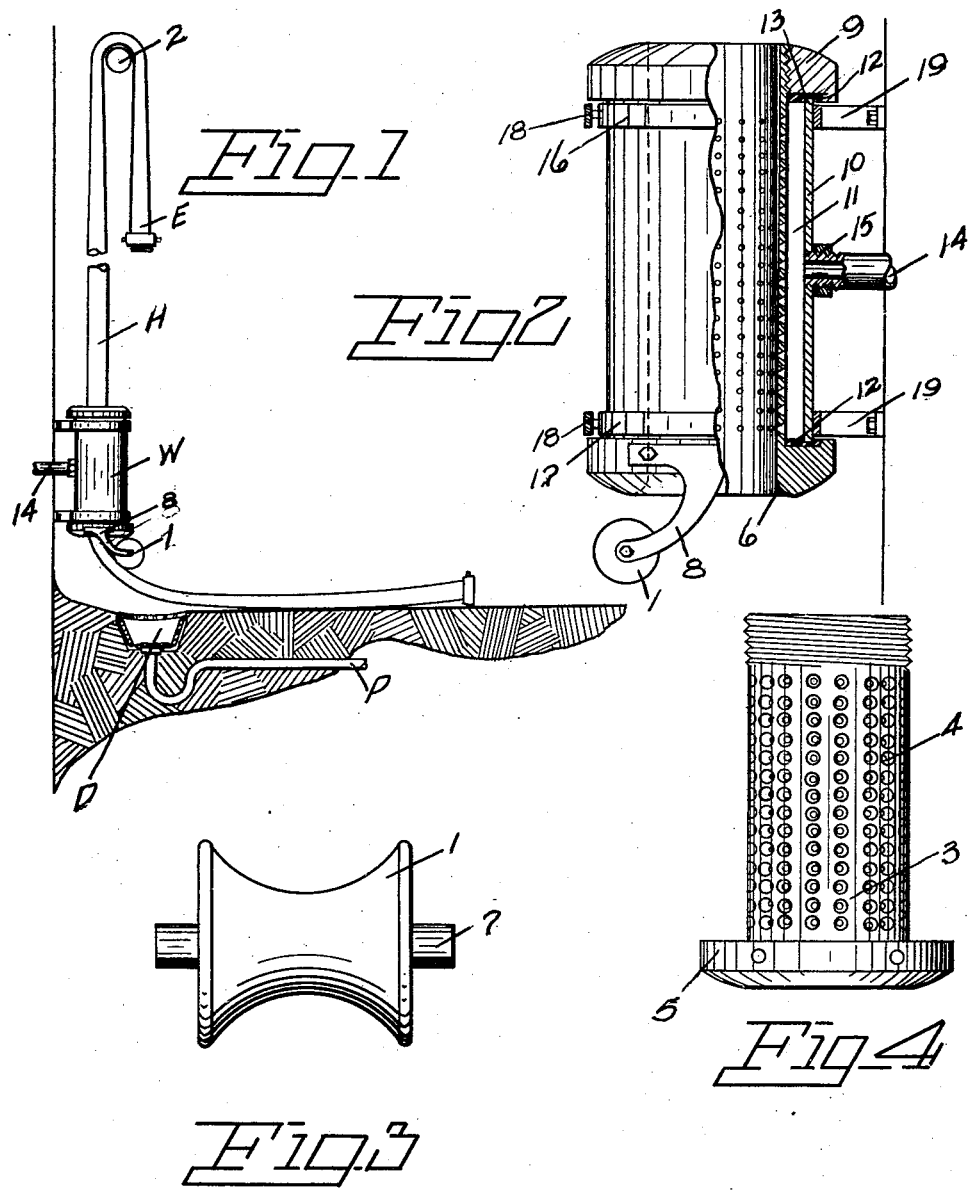

1,790,756

UNITED STATES PATENT OFFICE

GILBERT B. LOWERY, OF COEUR D'ALENE, IDAHO, ASSIGNOR OF ONE-HALF TO MANSFIELD JOHNSON, OF COEUR D'ALENE, IDAHO

HOSE WASHER

Application filed August 7, 1929. Serial No. 384,110.

My present invention relates to an improved hose washer which, while adapted for cleansing the exterior surface of garden hose and similar commodities, is especially designed for washing and cleansing the exterior surfaces of the sections of a fire hose, after the latter has been in use at a fire, or under other conditions during which mud, cinders, and other débris might accumulate on the hose.

The primary object of the invention is the provision of a rugged and durable device through which the hose sections may successively be passed and manipulated, preferably, by hand, for quickly and thoroughly washing away any débris that may be accumulated on the exterior surface of the hose. In carrying out my invention I utilize a water-spraying, hollow or tubular washer, through which the hose sections are passed, and means are provided for guiding the hose to facilitate its passage through the washer, and for adjusting the washer to various angular positions.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a view showing the washer in elevation, a hose section being passed therethrough, and the drain-box and sewer pipe for catching and carrying off the débris.

Figure 2 is an enlarged view in elevation of the washer, partly broken away for convenience of illustration.

Figure 3 is a face view of one of the guide rolls or rollers for the hose, located adjacent the end of the washer.

Figure 4 is a view of the headed spray-barrel of the washer.

In Figure 1 where the general arrangement and utility of parts are illustrated, the hose section H is passed upwardly through the tubular washer designated as a whole by the letter W, and guided by the grooved roller 1 below the washer. The upper end of the hose section is passed over an upper pulley or guide roller 2 that is suitably supported for the purpose directly above the washer, and the end E of the hose is pulled, by hand, to pass the length of the hose section upwardly through the washer. The exterior surface of the hose is cleansed by the application thereto of a number of water sprays, and the wash water and débris flow by gravity, down the lower end of the hose to the drain box D and thence to the sewer pipe P.

As the hose is pulled upwardly through the washer W its exterior surface is subjected to a water spray from the spray-barrel 3. This barrel is a cylinder, preferably, of metal, and of sufficient diameter to permit the passage therethrough of the hose H. The entire wall of the cylinder or barrel is perforated or fashioned with nozzles 4, and the lower, exterior head 5 of the barrel is provided with a flaring mouth 6 through which the hose passes on its way through the barrel. The guide pulley or grooved roller 1 is located adjacent the mouth 6, and its trunnions 7 are journaled in bearings in brackets 8 bolted to the head 5.

The upper end of the spray-barrel is exteriorly threaded to receive a screw ring or nut 9, and between this nut and the head 5, an exterior jacket 10 is clamped, a space 11 being provided between the inner barrel and the outer jacket to form an annular water-distributing chamber. Gaskets 12 are used at the ends of the outer jacket and the inner faces of the head and nut are countersunk or grooved as at 13 to receive the gaskets and form a water tight joint at the opposite ends of the water distributing chamber.

Water under pressure is supplied, through the water pipe 14 and nipple 15 of the jacket, to the interior of the space 11, and from this space the water is sprayed through the perforations or nozzles 4 and against the exterior surface of the hose as it is passed through the spray-barrel. Thus the entire surface of the hose is washed as the hose passes through the barrel and the passage of the hose is governed by the effectiveness of the spray in cleansing the hose. Ordinarily, the hose section is given a continuous pull through the barrel, but in some instances, it may be necessary to stop the movement and permit the hose to remain in the spray for a thorough cleansing of portions of the hose.

As here shown the washer is shown in vertical position and supported from a wall by the bands or hoops 16 and 17, which are provided with set bolts 18 to impinge against the jacket. The bands are adjustable in wall brackets 19 so that the washer may be tilted or adjusted to angular position before the pipe 14 is coupled to the nipple, or the pipe 14 may be a flexible coupling that would permit tilting adjustment of the washer, after which the washer is secured by the set bolts 18.

Having thus fully described my invention, what I claim as new and desire to secure by Letters Patent is:—

The combination with an outer jacket, of an inner perforated barrel the body of which is spaced from said jacket to form an annular water chamber, a water supply pipe connected to the jacket, an integral head on one end of the barrel closing one end of the chamber, a head threaded on the other end of the barrel closing the other end of the chamber, said integral head having a flaring mouth, and a guide roller supported from the latter head.

In testimony whereof I affix my signature.

GILBERT B. LOWERY.